US010013290B2

(12) United States Patent
Jones

(10) Patent No.: US 10,013,290 B2
(45) Date of Patent: Jul. 3, 2018

(54) SYSTEM AND METHOD FOR SYNCHRONIZING THREADS IN A DIVERGENT REGION OF CODE

(75) Inventor: Stephen Jones, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 771 days.

(21) Appl. No.: 13/608,912

(22) Filed: Sep. 10, 2012

(65) Prior Publication Data

US 2014/0075160 A1 Mar. 13, 2014

(51) Int. Cl.
*G06F 9/30* (2018.01)
*G06F 9/52* (2006.01)

(52) U.S. Cl.
CPC .................................... *G06F 9/522* (2013.01)

(58) Field of Classification Search
None
See application file for complete search history.

(56) References Cited

U.S. PATENT DOCUMENTS

| 7,512,950 | B1* | 3/2009 | Marejka ........................ 718/106 |
| 7,584,232 | B2 | 9/2009 | Guo |
| 7,770,170 | B2 | 8/2010 | Rector et al. |
| 7,788,468 | B1* | 8/2010 | Nickolls et al. ................ 712/22 |

OTHER PUBLICATIONS

Sampson et al.; Exploiting Fine-Grained Data Parallelism with Chip Multiprocessors and Fast Barriers; 2006; IEEE.*
Meng et al.; Dynamic Warp Subdivision for Integrated Branch and Memory Divergence Tolerance; ISCA '10; Jun. 2010; ACM.*

* cited by examiner

*Primary Examiner* — Corey S Faherty
(74) *Attorney, Agent, or Firm* — Iain Cunningham; Parker Justiss, P.C.

(57) ABSTRACT

A system and method are provided for synchronizing threads in a divergent region of code within a multi-threaded parallel processing system. The method includes, prior to any thread entering a divergent region, generating a count that represents a number of threads that will enter the divergent region. The method also includes using the count within the divergent region to synchronize the threads in the divergent region.

20 Claims, 1 Drawing Sheet

SYSTEM AND METHOD FOR SYNCHRONIZING THREADS IN A DIVERGENT REGION OF CODE

TECHNICAL FIELD

This application is directed, in general, to multi-threaded parallel processing systems and, more specifically, to synchronizing threads in a divergent region of code.

BACKGROUND

In graphical processing and other processing domains, programs are often required to operate on a large collection of data points, including such collections as an image or an audio file. Frequently, such programs may advantageously be structured as a sequence of actions, each of which may be performed concurrently on all data points in the collection.

One type of processing system designed to support such programs is referred to as a Single Instruction, Multiple Data (SIMD) system. A SIMD system provides a plurality of processors, each of which applies the instructions of the program to a single data point. In hardware, subsets of the plurality of processors may be implemented as multiprocessing units (MPUs).

SUMMARY

One aspect provides a method for synchronizing a plurality of threads. The method includes generating a count that represents a number of threads that will enter a divergent region. The count is generated prior to any thread entering the divergent region. The method also includes using the count within the divergent region to synchronize the threads in the divergent region.

Another aspect provides a non-transitory, computer readable medium that stores instructions. When executed by an MPU, the instructions cause the MPU to synchronize a plurality of threads executing on the MPU. Steps performed by the MPU include generating a count that represents a number of threads that will enter a divergent region. The count is generated prior to any thread entering the divergent region. The steps also include using the count within the divergent region to synchronize the threads in the divergent region.

Still another aspect provides a computing device. The computing device includes an MPU adapted to synchronize a plurality of threads executing on the MPU. The MPU is configured to generate a count that represents a number of threads that will enter a divergent region. The count is generated prior to any thread entering the divergent region. The MPU is further configured to use the count within the divergent region to synchronize the threads in the divergent region.

BRIEF DESCRIPTION

Reference is now made to the following descriptions taken in conjunction with the accompanying drawings, in which.

DETAILED DESCRIPTION

Figure 1:
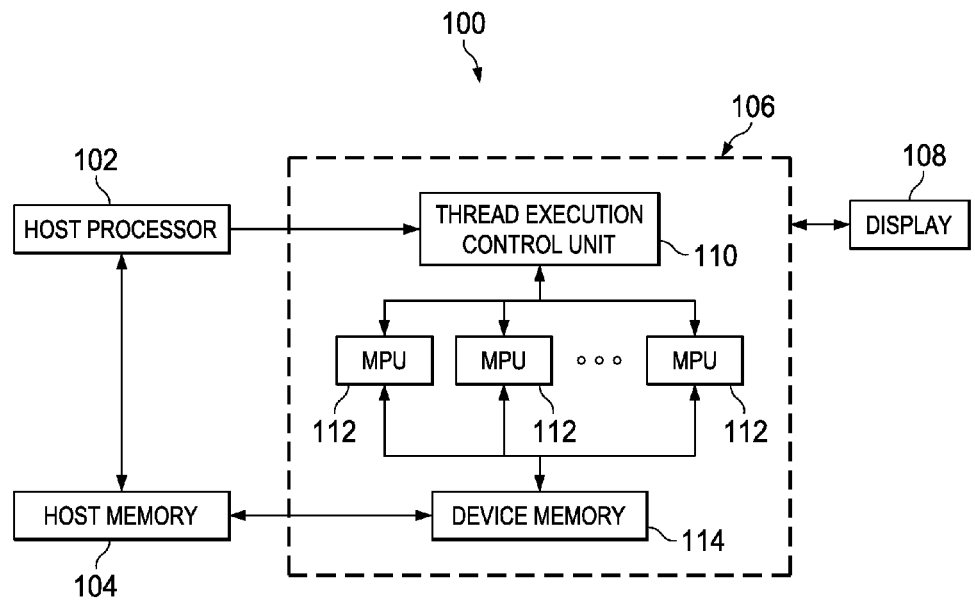
FIG. 1 is a schematic view of a system according to the disclosure.

FIG. 1 is a schematic view of a system 100 according to the disclosure. The system includes a host processor 102 coupled to a host memory 104 and to a graphics processing unit (GPU) 106. The GPU 106 is also coupled to the host memory 104 and may write data to and read data from the host memory 104 using direct memory access (DMA).

The GPU 106 is also coupled to a display 108 or other output device and is adapted to display information generated by the GPU 106 using the display 108. In other embodiments, the display 108 may also, or alternatively, be coupled to the host processor 102 for the display of information generated by the host processor 102.

The GPU 106 includes a plurality of multiprocessing units (MPUs) 112 under the control of a thread execution control unit (TECU) 110. The TECU 110 is coupled to the host processor 102 and adapted to receive control signals from the host processor 102. The MPUs 112 are coupled to a device memory 114 and are adapted to write data to and read data from the device memory 114. The device memory 114 is coupled to the host memory 104 and adapted to write data to and read data from the host memory 104.

The host processor 102 may execute a program structured as a sequence of SIMD programs called kernels. As part of executing the program, the host processor 102 may launch the sequence of kernels in the GPU 106.

The GPU 106 provides a parallel computing architecture that arranges parallel work into a hierarchy of threads, thread blocks (or simply blocks), and grids. A grid is a collection of threads, all of which execute a common kernel. An individual thread executes its kernel as a standalone entity, with independent data, stack and program counter. Threads are grouped into thread blocks of user-defined size (number of threads in the block). Threads within a block are guaranteed to execute concurrently.

For assignment to, and execution by, MPUs 112, the threads of a block may be divided into subsets. These subsets may alternatively be referred to as "warps" or "wavefronts." The size of a subset is typically selected as a power-of-two multiple (i.e., 1, 2, 4, etc.) of the number of processors in an MPU 112. The threads of a warp are assigned to a single MPU 112, and the MPU 112 executes one instruction of the threads of the warp in a corresponding 1, 2, 4, etc. number of clock cycles.

The threads of a block may be synchronized using an execution barrier operation (or simply barrier) or other synchronization operation. Often, a barrier is used to enforce an ordering constraint on operations issued before and after the barrier. Once a thread reaches a barrier, it cannot proceed until all threads have reached the barrier.

A barrier may be implemented as a counting semaphore. When a thread calls the barrier, the thread passes in a count of the number of active threads in the block. In response to the first such call, the semaphore initializes its count to the count passed in, less one, representing the number of threads remaining to call the semaphore. As each subsequent thread calls the counting semaphore, the semaphore decrements its count. Once the count reaches zero, all threads are allowed to proceed.

In other embodiments, a barrier may be implemented as a per-thread flag such as a bitfield. For example, if a barrier has 64 possible participants, a system according to the disclosure might use binary (1/0) bits in a 64-bit value to indicate arrival. A mask would allow a subset of threads to participate (implementing a "wait for only N threads" behavior). That is, the bitfield barrier would be initialized by creating a mask having a number of bits set (or cleared) that is equal to the received count of the number of active threads in the block.

In still other embodiments, a system according to the disclosure may be implemented as a network of logic gates to perform a multiple-input AND operation on waiting threads. In such a system, the subset operation would be performed by programmably tying to TRUE (or FALSE) a number of inputs equal to the received count of the number of active threads in the block.

Barriers and other synchronization operations may be implemented in hardware of the GPU or via software executing on the GPU. Some GPUs provide a certain number of hardware barriers and, when needed, may supply additional barriers using software.

Kernels may include sections or regions of code that may or may not be executed, depending upon a data-dependent conditional test. Such sections of code may be referred to as divergent regions. If a barrier is placed in such a divergent region, some threads may not reach the barrier, based upon the data the thread is operating upon. Because no thread may proceed past a barrier until all threads have reached the barrier, this may result in deadlock or incorrect execution. For these reasons, it is typically illegal to use barriers within divergent regions of code.

While the processing unit 106 is referred to herein as a graphics processing unit, it will be understood that the processing unit 106 may be used for data processing that may be unrelated to graphics—that is, in any application requiring multi-threaded processing. In other embodiments, the processing unit 106 may incorporate circuitry optimized for general purpose processing, while preserving the underlying computational architecture described herein.

The host processor 102 includes one or more subsystems adapted to receive programs stored on one or more types of computer readable medium. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

Figure 2:
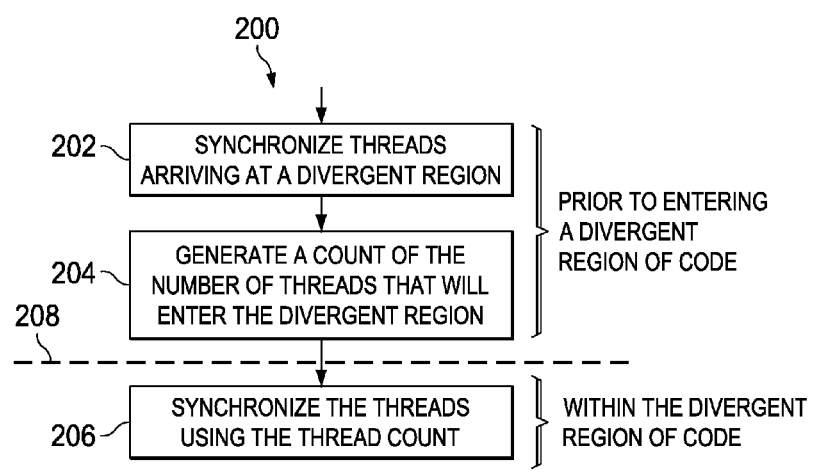
FIG. 2 is a method according to the disclosure.

FIG. 2 is a method 200 according to the disclosure. The method 200 is suitable for use where a program is written using structured control flow. Steps shown above the dashed line 208 are performed prior to entering a divergent region of code, while steps below the dashed line 208 are performed while within the divergent region.

Prior to entering the divergent region of code, in step 202, all threads arriving at the divergent region are synchronized using a barrier operation. Once all threads are synchronized, in step 204, a count is generated of a number of threads that will enter the divergent region.

Subsequently, in step 206, threads within the divergent region may be synchronized by supplying the count to a barrier operation, which will wait for only that number of threads to reach the barrier before continuing execution of all threads within the divergent region.

In some embodiments, each thread may calculate a Boolean variable (or flag) pass, indicating whether the thread will enter the divergent region. Then, steps 202 and 204 may be performed together by use of a barrier operation that receives pass from each thread, as well as current_count, a count of the number of threads arriving at the divergent region. The barrier synchronizes all threads arriving at the divergent region, using current_count, then returns new_count, a count of the number of threads reaching the barrier with pass set true.

In other embodiments, where threads are arranged in subsets (also known as warps or wavefronts), step 204 may include determining for each subset whether any thread in the subset will enter the divergent region, tallying the number of subsets including such a thread, and generating the count using the tally of subsets. In some such embodiments, the count of the number of threads entering the divergent region may be generated by multiplying the tally of subsets by the number of threads in each subset.

In some embodiments, a second divergent region is entered by all threads not entering the first divergent region. Such conditions arise, for example, for an if statement that has both then and else clauses. In such embodiments, where synchronization of the threads entering the second divergent region is desired and the Boolean value pass was calculated for each thread, a count of the threads entering the second divergent region may be generated using !pass (or NOT pass, i.e., the logical negations of pass).

Where a second divergent region is encountered that is within the first divergent region and it is desired to synchronize threads that enter the second divergent region, similar actions may be performed as have been described for the first divergent region. When synchronizing threads arriving at the second divergent region, in step 202, the count of threads arriving at the second divergent region will be the same as the count of threads entering the first divergent region (new_count, in some embodiments described above).

In some embodiments, instructions for performing the steps of the method 200 (or other embodiment of the disclosure) are generated automatically by a compiler when the compiler encounters an "if" statement, "while" statement, or other statement producing a divergent region of code, where such divergent region includes a synchronization operation. Such a compiler may produce a more efficient implementation than requiring a programmer to hand code a method according to the disclosure. Additionally, the programmer will find such a compiler more convenient to use, as the programmer will not be required to add code implementing such a method before and within each divergent region of code.

It will be understood that such a compiler may utilize the method 200 or any other method according to the disclosure. Such a compiler may employ more than one method embodying the disclosure in a single program. Such a method may employ more than one type of barrier to implement the method, and may select between synchronization operations implemented in hardware and barriers implemented in software. Such selection may be made based upon a count of such synchronization operations already in use in a program that includes multiple divergent regions requiring synchronization.

Those skilled in the art to which this application relates will appreciate that other and further additions, deletions, substitutions and modifications may be made to the described embodiments.

What is claimed is:

1. A method for synchronizing a plurality of threads of a structured control flow program, the method comprising:
 synchronizing threads arriving at a conditional statement that precedes a divergent region, wherein the conditional statement is a data-dependent conditional test and the divergent region is a section of code that is executed based thereon;
 generating a count representing a number of the threads that will enter the divergent region, wherein the generating the count is performed once the threads are synchronized and before any of the threads enter the divergent region; and using the count generated before any of the threads enter the divergent region within the divergent region to synchronize the threads in the divergent region.

2. The method as recited in claim 1, wherein the using the count comprises supplying the count to a barrier within the divergent region and the barrier using the count to synchronize the threads in the divergent region.

3. The method of claim 1, wherein the plurality of threads is arranged in a plurality of groups of threads, and wherein the generating the count further comprises:
for each group of threads, determining whether any thread in the group will enter the divergent region; and
generating the count based on the result of the determining.

4. The method of claim 3, wherein:
the determining whether any thread in the group will enter the divergent region further comprises identifying one thread in the group that will enter the divergent region; and
the generating the count based on the result of the determining further comprises generating the count based on the identified threads.

5. The method of claim 1, wherein the using the count to synchronize the threads further comprises using a barrier implemented as one of a counting semaphore, a bit field, and a network of logic gates, wherein the barrier is implemented in one of hardware and software.

6. The method of claim 5, wherein the using the barrier further comprises initializing the barrier using a value of the count.

7. The method of claim 1, wherein the count is a first count, the divergent region is a first divergent region, and the first divergent region comprises a second divergent region, the method further comprising:
generating a second count representing a number of threads that will enter the second divergent region, the second count generated prior to any thread entering the second divergent region, wherein the second count is generated using the first count; and
using the second count within the second divergent region to synchronize the threads in the second divergent region.

8. A non-transitory, computer readable medium storing instructions that, when executed by a multiprocessing unit, cause the multiprocessing unit to synchronize a plurality of threads executing on the multiprocessing unit using a structured control flow, by performing the steps of:
synchronizing threads arriving at a conditional statement that precedes a divergent region, wherein the conditional statement is a data-dependent conditional test and the divergent region is a section of code that is executed based thereon;
generating a count representing a number of the threads that will enter the divergent region, wherein the generating the count is performed once the threads are synchronized and before any of the threads enter the divergent region; and
within the divergent region, using the count to synchronize the threads in the divergent region.

9. The computer-readable medium of claim 8, wherein the step of using the count comprises providing the count to a barrier within the divergent region and the divergent region barrier employing the count to synchronize the threads in the divergent region.

10. The computer-readable medium of claim 8, wherein the plurality of threads is arranged in a plurality of groups of threads, and wherein the generating the count further comprises:
for each group of threads, determining whether any thread in the group will enter the divergent region;
generating the count based on the result of the determining.

11. The computer readable medium of claim 8, wherein the instructions are generated by a compiler automatically when the compiler encounters a statement producing a divergent region of code that includes a synchronization operation.

12. The computer-readable medium of claim 8, wherein the step of using the count to synchronize the threads further comprises using a barrier implemented as one of a counting semaphore, a bit field, and a network of logic gates, wherein the barrier is implemented in one of hardware and software, the barrier initialized using a value of the count.

13. The computer-readable medium of claim 8, wherein the count is a first count, the divergent region is a first divergent region, and the first divergent region comprises a second divergent region, the steps further comprising:
generating a second count representing a number of threads that will enter the second divergent region, the second count generated prior to any thread entering the second divergent region, wherein the second count is generated using the first count; and
using the second count within the second divergent region to synchronize the threads in the second divergent region.

14. A computing device, comprising:
a multiprocessing unit adapted to synchronize a plurality of threads executing on the multiprocessing unit using a structured control flow, the multiprocessing unit configured to:
synchronize the plurality of threads that arrive at a conditional statement that precedes a divergent region, wherein the conditional statement is a data-dependent conditional test and the divergent region is a section of code that is executed based thereon;
generate a count representing a number of the plurality of threads that will enter the divergent region, wherein the count is generated after the plurality of threads are synchronized and before any of the plurality of threads enter the divergent region; and
use the count within the divergent region to synchronize the threads in the divergent region.

15. The computing device of claim 14, wherein the multiprocessing unit is configured to use the count by providing the count to a barrier within the divergent region and the barrier using the count to synchronize the threads in the divergent region.

16. The computing device of claim 14, wherein the plurality of threads is arranged in a plurality of groups of threads, and wherein generating a count further comprises:
for each group of threads, determining whether any thread in the group will enter the divergent region;
generating the count based on the result of the determining.

17. The computing device of claim 16, wherein:
the determining whether any thread in the group will enter the divergent region further comprises identifying one thread in the group that will enter the divergent region; and the generating the count based on the result of the determining further comprises generating the count based on the identified threads.

18. The computing device of claim 14, wherein the using the count to synchronize the threads further comprises using a barrier implemented as one of a counting semaphore, a bit field, and a network of logic gates, wherein the barrier is implemented in one of hardware and software.

19. The computing device of claim 18, wherein the using a barrier further comprises initializing the barrier using a value of the count.

20. The computing device of claim 14, wherein the count is a first count, the divergent region is a first divergent region, and the first divergent region comprises a second divergent region, the multiprocessing unit further configured to:
   generate a second count representing a number of threads that will enter the second divergent region, the second count generated prior to any thread entering the second divergent region, wherein the second count is generated using the first count; and
   use the second count within the second divergent region to synchronize the threads in the second divergent region.

* * * * *

UNITED STATES PATENT AND TRADEMARK OFFICE
CERTIFICATE OF CORRECTION

| | |
|---|---|
| PATENT NO. | : 10,013,290 B2 |
| APPLICATION NO. | : 13/608912 |
| DATED | : July 3, 2018 |
| INVENTOR(S) | : Stephen Jones |

It is certified that error appears in the above-identified patent and that said Letters Patent is hereby corrected as shown below:

In the Claims

In Claim 1, Column 5, Line 2, delete "divergent region within" and insert --divergent region, within--

Signed and Sealed this
Twenty-eighth Day of August, 2018

Andrei Iancu
*Director of the United States Patent and Trademark Office*